United States Patent
Degawa et al.

(10) Patent No.: US 9,871,789 B2
(45) Date of Patent: *Jan. 16, 2018

(54) AUTHENTICATION SYSTEM, AUTHENTICATION METHOD AND SERVICE PROVIDING SYSTEM

(71) Applicant: ADVANTEST CORPORATION, Tokyo (JP)

(72) Inventors: Katsuhiko Degawa, Saitama (JP); Kengo Suzuki, Saitama (JP); Yushi Nishino, Gunma (JP); Masakatsu Suda, Saitama (JP); Kosuke Ikeda, Saitama (JP)

(73) Assignee: ADVANTEST CORPORATION, Tokyo (JP)

( * ) Notice: Subject to any disclaimer, the term of this patent is extended or adjusted under 35 U.S.C. 154(b) by 193 days.

This patent is subject to a terminal disclaimer.

(21) Appl. No.: 14/875,711

(22) Filed: Oct. 6, 2015

(65) Prior Publication Data

US 2016/0127362 A1    May 5, 2016

(30) Foreign Application Priority Data

Oct. 31, 2014 (JP) .................................. 2014-222709

(51) Int. Cl.
*H04L 29/06* (2006.01)

(52) U.S. Cl.
CPC ...... *H04L 63/0861* (2013.01); *H04L 63/0853* (2013.01)

(58) Field of Classification Search
CPC ... H04L 63/0861; H04L 63/08; H04L 9/3231; H04L 9/3247; H04L 9/3268; H04L 9/3271; G06F 21/32
See application file for complete search history.

(56) References Cited

U.S. PATENT DOCUMENTS

| | | |
|---|---|---|
| 2002/0016913 A1 | 2/2002 | Wheeler et al. |
| 2003/0204743 A1 | 10/2003 | Devadas et al. |

(Continued)

FOREIGN PATENT DOCUMENTS

| | | |
|---|---|---|
| JP | 2003-016364 A | 1/2003 |
| JP | 2006-155547 A | 6/2006 |
| JP | 2013-218483 A | 10/2013 |

OTHER PUBLICATIONS

Office Action issued for counterpart Japanese Application 2014-222709, issued by the Japan Patent Office dated Jun. 27, 2017.

(Continued)

*Primary Examiner* — Amir Mehrmanesh

(57) ABSTRACT

An authentication system comprising an authentication terminal and an authentication server is provided. The authentication terminal comprises an authentication apparatus authenticating an authentication subject, an artifact operating in accordance with an input signal and a signal processing section inputting an input signal without including information of the authentication subject designated by the authentication server in the artifact and outputting an output signal in accordance with an operation result of the artifact as an authentication result when the authentication result in the authentication apparatus is passed. The authentication server authenticates the authentication subject based on the output signal.

13 Claims, 10 Drawing Sheets

(56) References Cited

U.S. PATENT DOCUMENTS

| | | | |
|---|---|---|---|
| 2005/0015630 A1* | 1/2005 | Yumoto | G07C 9/00087 |
| | | | 726/19 |
| 2008/0148059 A1* | 6/2008 | Shapiro | G06F 21/32 |
| | | | 713/186 |
| 2009/0271860 A1 | 10/2009 | Nonaka et al. | |
| 2010/0250936 A1 | 9/2010 | Kusakawa | |
| 2010/0287369 A1* | 11/2010 | Monden | G06F 21/32 |
| | | | 713/156 |
| 2013/0047209 A1 | 2/2013 | Satoh et al. | |
| 2014/0241591 A1* | 8/2014 | Matsuki | G06K 9/00013 |
| | | | 382/115 |
| 2014/0279532 A1 | 9/2014 | Tremlet | |

OTHER PUBLICATIONS

Office Action issued for counterpart Japanese Application 2014-222709, issued by Japan Patent Office dated Nov. 9, 2016.

* cited by examiner

CHARACTERISTIC STORAGE SECTION 210

| ARTIFACT 130A | | |
|---|---|---|
| REGISTRATION | INPUT SIGNAL | OUTPUT SIGNAL |
| #1 | P125 | O125 |
| #2 | P35 | O35 |
| ⋮ | ⋮ | ⋮ |
| #10 | P23 | O23 |

*FIG. 3*

AUTHENTICATION SYSTEM, AUTHENTICATION METHOD AND SERVICE PROVIDING SYSTEM

The contents of the following Japanese patent application are incorporated herein by reference:
NO. 2014-222709 filed on Oct. 31, 2014.

BACKGROUND

1. Technical Field

The present invention is related to an authentication system, an authentication method and a service providing system.

2. Related Art

Conventionally, an authentication using inherent information such as biometric information and the like is known. For example, user authentication is performed by acquiring biometric information of an user via a biometric sensor arranged in an user terminal. Related prior art documents are described as below:
Patent Document 1 Japanese Patent Application Publication No. 2006-155547;
Patent Document 2 Japanese Patent Application Publication No. 2013-218483;
Patent Document 3 Japanese Patent Application Publication No. 2011-198317.

SUMMARY

The acquired biometric information is sent to an authentication server and the biometric information is authenticated at the authentication server sometimes. However, in this case, since the biometric information is carried on a network and the authentication server, there is a risk of biometric information leakage. Also, the acquired biometric information is authenticated at a user terminal and an authentication result is sent to an authentication server sometimes. However, in this case, it is difficult for the authentication server to discriminate whether the authentication result is reliable or not.

Here, a purpose of one aspect of a technical innovation included in the present specification is to provide an authentication system, an authentication method and a service providing system which can solve the above-described problem. The purpose is achieved by a combination of features described in claims. In other words, a first aspect of the present invention is to provide an authentication system comprising an authentication terminal and an authentication server. In the authentication system, the authentication terminal comprises an authentication apparatus authenticating an authentication subject, an artifact operating in accordance with an input signal and a signal processing section inputting an input signal without including information of the authentication subject designated by the authentication server in the artifact and outputting an output signal in accordance with an operation result of the artifact as an authentication result when the authentication result in the authentication apparatus is passed and the authentication server authenticates the authentication subject based on the output signal.

A second aspect of the present invention provides a service providing system comprising a service providing server providing services to an user and the authentication system of the first aspect authenticating an user as an authentication subject. In the service providing system, the service providing server provides services to the user authenticated by the authentication system.

A third aspect of the present invention provides an authentication method using an authentication terminal and an authentication server. The authentication method comprises a terminal side authentication stage and a signal processing stage in the authentication terminal and a server side authentication stage in the authentication server. An authentication subject is authenticated in the terminal side authentication stage, and when the authentication result in the authentication stage is passed, an input signal without including information of the authentication subject authenticated by the authentication server is input in an artifact operating in accordance with the input signal and an output signal based on an operation result of the artifact is output as an authentication result in the signal processing stage, and the authentication subject is authenticated based on the output signal in the server side authentication stage.

Further, the above summary of invention does not necessarily describe all necessary features of the present invention and the present invention may also be a sub-combination of the features described above.

BRIEF DESCRIPTION OF THE DRAWINGS

FIG. 3 is a drawing showing another example of a characteristic storage section 210.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
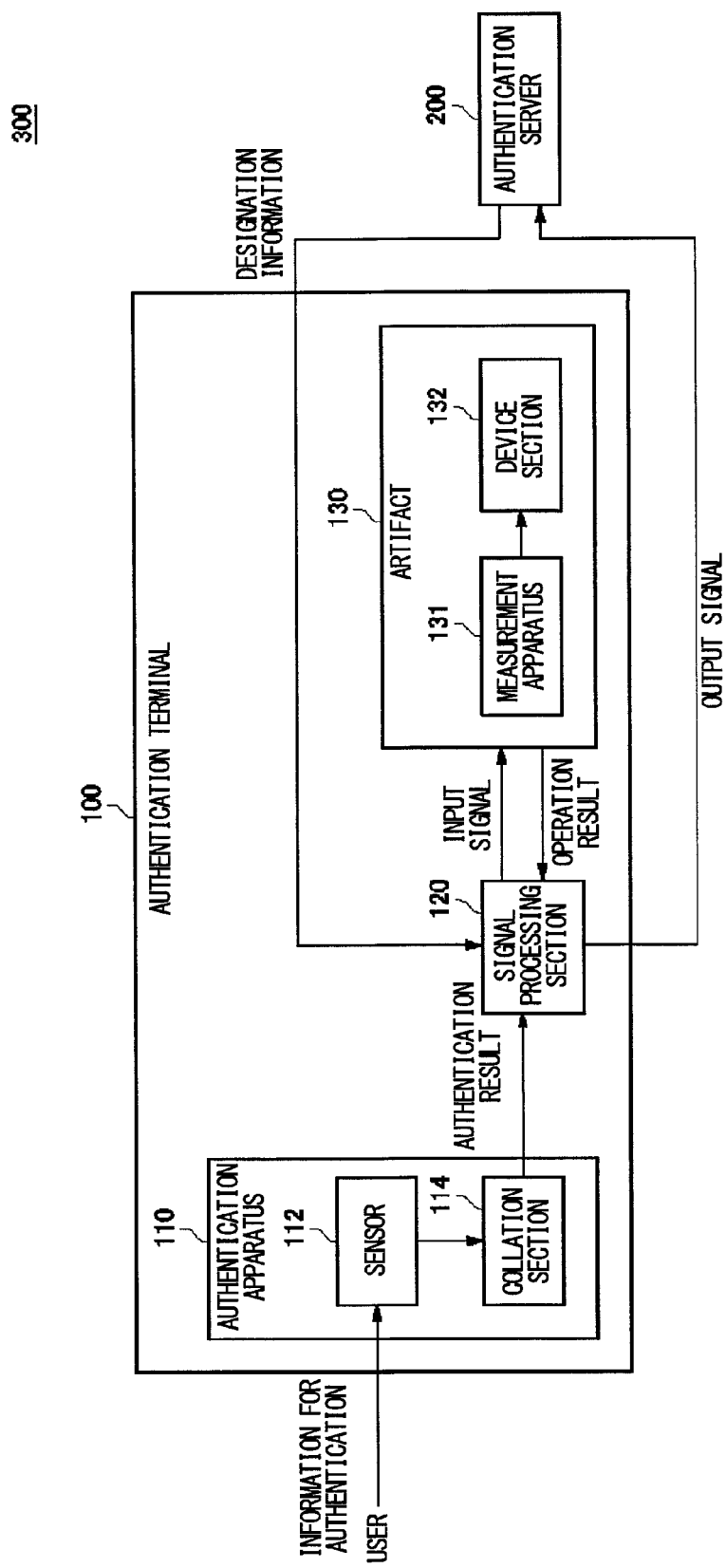
FIG. 1 is a drawing showing a configuration example of an authentication system 300.

FIG. 1 is a drawing showing a configuration example of an authentication system 300. The authentication system 300 authenticates an authentication subject by using information for authentication of the authentication subject. The authentication system 300 comprises an authentication terminal 100 and an authentication server 200. The authentication terminal 100 and the authentication server 200 communicate with each other. Although a single authentication terminal 100 is shown in FIG. 1, the authentication server 200 can communicate with a plurality of the authentication terminals 100.

The authentication subject is, for example, an user of the authentication terminal 100, but is not limited to this. The authentication terminal 100 authenticates the authentication subject by using the information for authentication. The information for authentication may be inherent information of the authentication subject. The inherent information indicates information which cannot be changed or is extremely difficult to be changed and is different per individual. The inherent information is, for example, biometric information of an user. Specifically, fingerprint data, iris data, vein pattern data, voiceprint data, vital reaction data and the like are exemplified. The authentication subject may not be living creatures. For example, paper can be an authentication subject and fiber pattern of the paper can be used as information for authentication.

The authentication terminal 100 comprises an authentication apparatus 110, a signal processing section 120 and an artifact 130. The authentication apparatus 110 includes a sensor 112 and a collation section 114. The sensor 112 acquires information for authentication of an authentication subject. The sensor 112 can acquire information for authentication such as fingerprint data and the like by photographing a part of the authentication subject.

The collation section 114 authenticates the authentication subject based on the information for authentication that the sensor 112 acquires. The collation section 114 stores template information for collation beforehand and authenticates the authentication subject based on a matching rate between the information for authentication and template information. The collation section 114 may store a plurality of template information corresponding to a plurality of types of information for authentication. For example, the collation section 114 stores a plurality of template information corresponding to fingerprint data of a plurality of fingers of the user. The collation section 114 notifies the signal processing section 120 of an authentication result.

The signal processing section 120 inputs an input signal in the artifact 130 based on the authentication result received from the authentication apparatus 110. The artifact 130 is an apparatus operating in accordance with the input signal and outputting an operation result and comprises a input/output characteristic which is difficult to be duplicated physically. In other words, the artifact 130 comprises a peculiar and unique input/output characteristic in its apparatus and has a property that an individual can be identified by combinations of the input signal and the output signal.

The artifact 130 of this example comprises a device section 132 and a measurement apparatus 131. For example, the device section 132 is a device comprising a peculiar input/output characteristic by production variation which is difficult to be reproduced. The device section 132 may be a semiconductor circuit having a production variation. The measurement apparatus 131 measures the production variation of the device section 132 and outputs the result of the measurement to the signal processing section 120. The measurement apparatus 131 of this example inputs a prescribed input signal to the device section 132. The device section 132 operates by the characteristic corresponding to the production variation and outputs a signal. The measurement apparatus 131 measures the signal that the device section 132 outputs. When an identical signal is input, each artifact 130 may output a different signal respectively in accordance with each characteristic. For example, when an input signal having an identical bit pattern or waveform is input, each artifact 130 can output a signal having different inclination of waveforms, delay time, amplitude of waveforms and the like respectively in accordance with the characteristic by each production variation. The measurement apparatus 131 measures analog quantity of a predetermined parameter in the signal that the device section 132 outputs. The measurement apparatus 131 outputs the result of the measurement as digital data to the signal processing section 120. The measurement apparatus 131 may perform processes such as filtering, correction and the like and output with regards to the result of the measurement. The correction may be performed in accordance with a temperature of the device section 132 and the like.

When the authentication result in the authentication apparatus 110 is passed, the signal processing section 120 inputs input signal without including information of the authentication subject (specifically, information for authentication) to the measurement apparatus 131 of the artifact 130. The pass of the authentication result indicates, for example, a matching rate between the information for authentication of the user and the template information is equal to or more than a prescribed value. The matching rate indicates a value, for example, such as a correlation coefficient, which is larger as a similarity of two information, is higher. Also, in the present specification, when the authentication result is passed, it sometimes simply indicates to have authenticated or to be authenticated.

The input signal to be input in the artifact 130 is designated by the authentication server 200. The authentication server 200 may send a signal including the input signal itself to the signal processing section 120. Also, the signal processing section 120 stores a plurality of input signals beforehand and the authentication server 200 may send a signal designating any one of the input signals. Also, the signal processing section 120 comprises a circuit which can generate an input signal based on a designated parameter and the authentication server 200 may designate the parameter. Like these, information that the authentication server 200 designates an input signal with regards to the signal processing section 120 refers to designation information. When the authentication result at the authentication apparatus 110 is failed, the signal processing section 120 may not input the input signal in the artifact 130. The signal processing section 120 may notify the authentication server 200 of that the authentication result at the authentication apparatus 110 is failed.

The device section 132 of the artifact 130 operates in accordance with the input signal. The measurement apparatus 131 measures an operation result of the device section 132 and outputs a signal indicating the operation result. As described above, since the artifact 130 has the peculiar input/output characteristic, a signal that the artifact 130 outputs is a peculiar signal of the artifact 130. Also, since the artifact 130 does not comprise information of the authentication subject and no information of the authentication subject is included in the input signal, the signal that the artifact 130 outputs does not include the information of the authentication subject (specifically, information for authentication).

The signal processing section 120 sends the output signal corresponding to the operation result of the artifact 130 to the authentication server 200 as the authentication result of the authentication subject. The signal processing section 120 may send at least a part of the signal that the artifact 130 outputs to the authentication server 200 as the output signal. The output signal does not include the information of the authentication subject (specifically, the information for authentication).

The authentication server 200 authenticates the authentication subject based on the output signal received from the authentication terminal 100. The authentication server 200 acquires information of the input/output characteristic of each artifact 130 beforehand. The authentication server 200 determines an output signal expected with regards to the designated input signal from the information of the input/output characteristic, and authenticates the authentication subject when the matching rate between the expected output signal and the output signal received from the signal processing section 120 is equal to or more than a prescribed value.

For example, the authentication server 200 stores a combination of the bit pattern of the input signal to each artifact 130 and the digital data of the output signal expected with regards to the input signal as the information of the input/output characteristic. In this case, the authentication server 200 compares the digital data of the expected output signal with the digital data of the output signal received from the signal processing section 120 and authenticates the authentication subject.

Also, the authentication server 200 may store a combination of at least one parameter of the input signal to the artifact 130 and the parameter of the output signal expected with regards to the input signal as the information of the input/output characteristic. For example, the parameter is a function indicating a signal waveform, an edge timing of signal waveform, an edge inclination of signal waveform, an amplitude value of signal waveform and the like.

The authentication server 200 may store a relation between the parameters of the input signal and the expected output signal beforehand. The relation may be a table or a formula. The measurement apparatus 131 of the artifact 130 measures the parameters in the signal that the device section 132 outputs. Also, in place of the measurement apparatus 131, the signal processing section 120 may measure the parameters in the signal that the device section 132 outputs and generate the output signal indicating the result of the measurement.

Also, the signal processing section 120 may generate an output signal including at least either of the identification information of the authentication terminal 100 and the artifact 130. The authentication server 200 judges which of the artifacts 130 the output signal is a signal from based on the identification information and authenticates the user based on the information of the input/output characteristic of the artifact 130.

According to the authentication system 300 of the present example, only when the authentication result in the authentication apparatus 110 is passed, the signal processing section 120 inputs the input signal in the artifact 130 and generates the output signal. Therefore, as long as the output signal that the authentication server 200 received is the expected signal, the authentication server 200 can discriminate that the authentication result in the authentication apparatus 110 is passed.

Also, according to the authentication system 300 of the present example, since the information for authentication such as biometric information and the like is not held in the network and the authentication server 200, it can prevent the information for authentication such as biometric information and the like from leaking. Also, since the input signal designated by the authentication server 200 is input in the artifact 130 and a peculiar operation result of the artifact 130 is sent to the authentication server 200, the authentication server 200 can confirm a reliability of the output signal from the authentication terminal 100.

Also, data communicating between the authentication server 200 and the authentication terminal 100 is preferred to be encrypted. Also, even if the information of the input/output characteristic of the artifact 130 is leaked, it is only needed to replace the artifact 130. Therefore, disadvantages of information leakage can be decreased if comparing with a case that biometric information is leaked.

Further, it is preferable that the authentication apparatus 110, the signal processing section 120 and the artifact 130 send and receive information after confirming that the connecting party is a preregistered apparatus. For example, the authentication apparatus 110, the signal processing section 120 and the artifact 130 store identification information such as series numbers of other apparatuses and the like beforehand. Each apparatus sends its own identification information to other apparatuses. Each apparatus may send and receive information with each other in a condition that the received identification information and the stored identification information are matched. Accordingly, the authentication operation can be stopped when the authentication apparatus 110 and the like are replaced fraudulently.

Also, the authentication apparatus 110 and the artifact 130 may be formed in the same semiconductor chip. In this case, sending and receiving of the identification information between the authentication apparatus 110 and the artifact 130 can be omitted. Also, the authentication apparatus 110 and the artifact 130 may be formed within an arithmetic chip of the signal processing section 120. In this case, the signal processing section 120 may send and receive the identification information between the arithmetic chip mutually.

Figure 2:
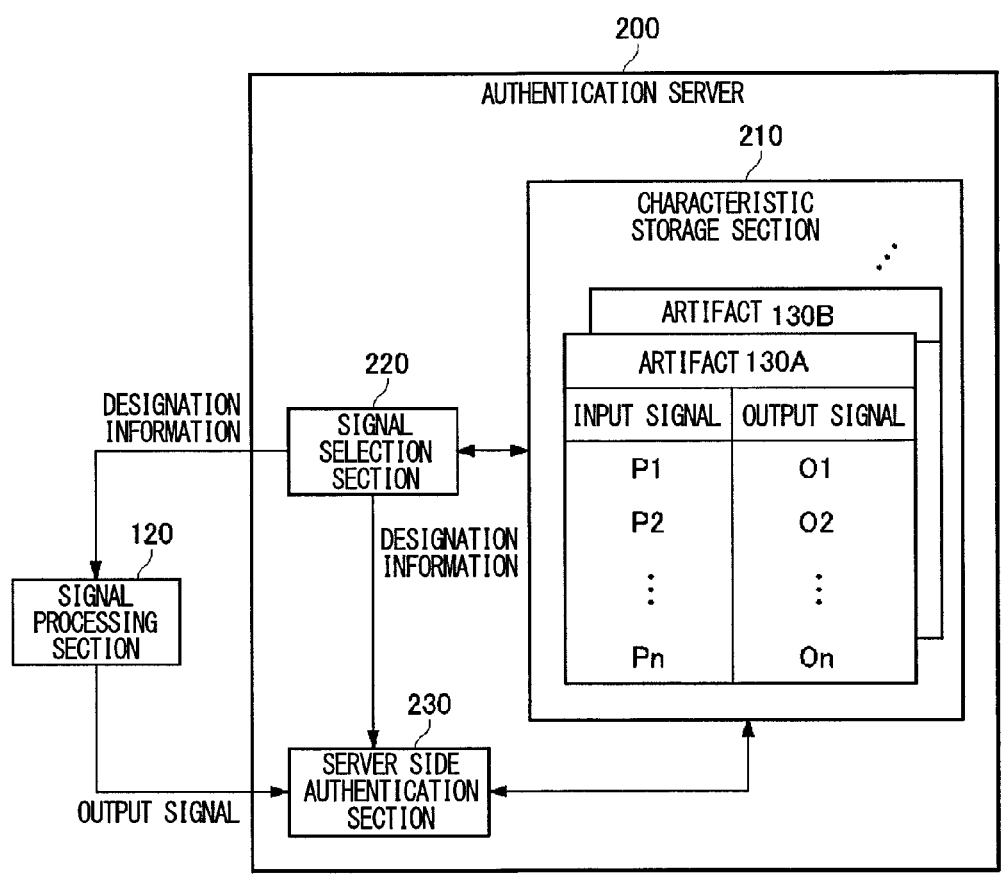
FIG. 2 is a drawing showing a configuration example of an authentication server 200.

FIG. 2 is a drawing showing a configuration example of the authentication server 200. The authentication server 200 of the present example comprises the characteristic storage section 210, the signal selection section 220 and the server side authentication section 230. The characteristic storage section 210 stores a combination table for characteristic of the input signal and characteristic of the expected output signal in each authentication terminal 100 (that is, per artifact 130).

The characteristic storage section 210 of the present example, stores a combination table for a plurality of bit patterns Pk of the input signal and a plurality of digital data Ok of the expected output signal. The digital data is digitalized data by measuring analog quantity of inclination of waveform, amplitude, delay amount and the like of the signal that the device section 132 outputs beforehand when each input signal is input. The measurement is performed during manufacturing examination of the artifact and the like and is stored in the authentication server 200. The characteristic storage section 210 may store a bit pattern Pk of the same input signal and may store a bit pattern Pk of a different input signal with regards to two artifacts 130.

The signal selection section 220 selects an input signal corresponding to the authentication terminal 100 requesting authentication. Here, the input signal corresponding to the authentication terminal 100 indicates an input signal that the characteristic storage section 210 stores corresponding to the authentication terminal 100. The signal selection section 220 may select randomly one and more of input signals from a plurality of the input signals that the characteristic storage section 210 is storing.

The signal selection section 220 sends the designation information indicating the selected input signal to the signal processing section 120. The designation information to be sent to the signal processing section 120 may be an input signal itself and may be a signal designating any one of a plurality of the input signals which the signal processing section 120 is storing.

The signal processing section 120 inputs the input signal in accordance with the designation information in the artifact 130 in a condition that the authentication subject is authenticated at the authentication apparatus 110. The signal processing section 120 may request the signal selection section 220 to designate an input signal in a condition of that the authentication subject at the authentication apparatus 110 is authenticated. The signal processing section 120 generates an output signal in accordance with the operation result of the artifact 130 and sends it to the server side authentication section 230.

The server side authentication section 230 authenticates the authentication subject based on whether the input signal designated with regards to the signal processing section 120 is conversed to the output signal in accordance with the input/output characteristic of the artifact 130. The server side authentication section 230 of the present example receives the designation information of the input signal from the signal selection section 220 and extracts the output signal expected with regards to the input signal from the characteristic storage section 210.

The server side authentication section 230 compares the output signal received from the signal processing section 120 with the output signal extracted from the characteristic storage section 210 and authenticates the authentication subject. For example, when the matching rate between the digital data of the output signal received from the signal processing section 120 and the digital data of the output signal extracted from the characteristic storage section 210 is equal to or more than a prescribed value, the server side authentication section 230 authenticates the authentication subject.

FIG. 3 is a drawing showing another example of the characteristic storage section 210. The authentication server 200 of the present example allocates input signals for each purpose of the authentication result. The characteristic storage section 210 of the present example registers a plurality of the input signals as the signals allocated for a plurality of purposes beforehand in addition to the information of input/output characteristic of the combination table and the like shown in FIG. 2. In the present example, ten input signals are registered.

Figure 4:
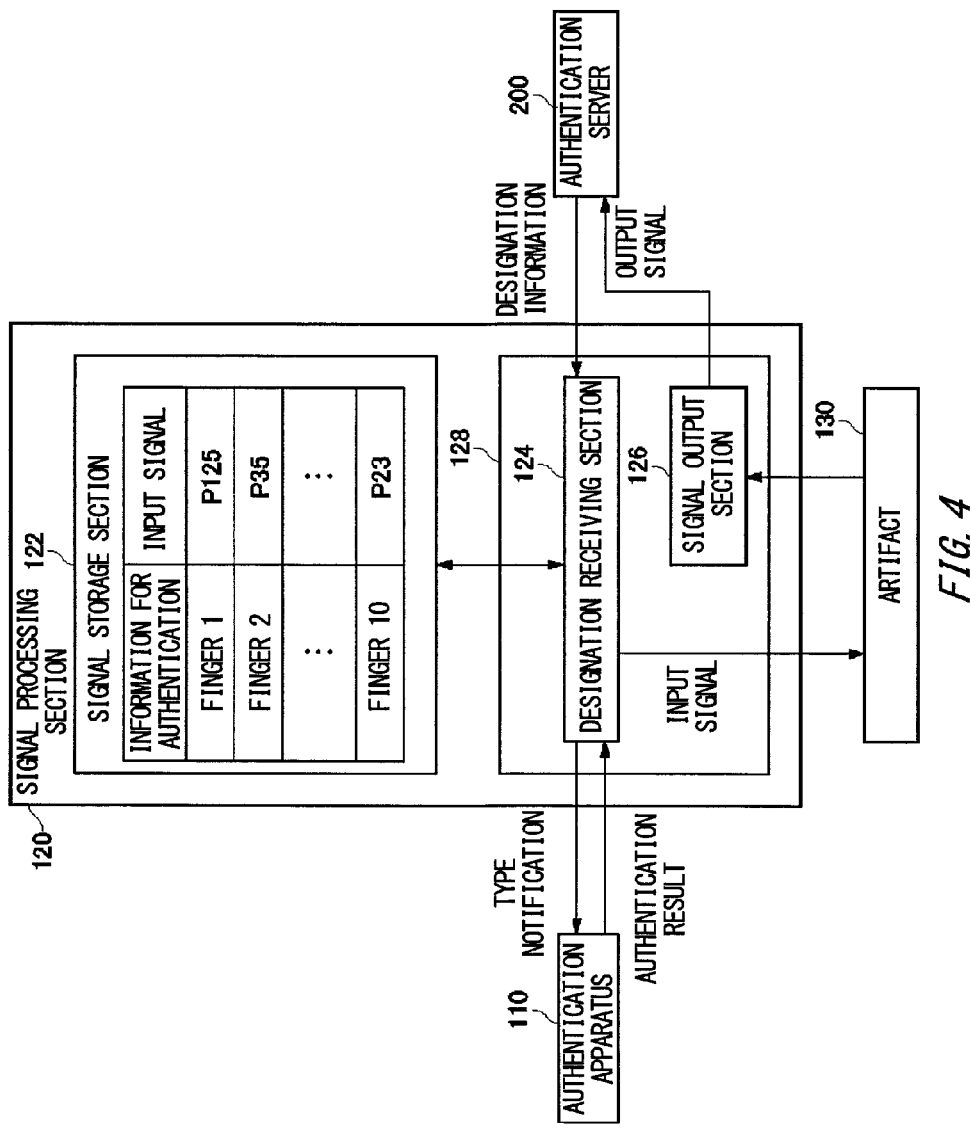
FIG. 4 is a drawing showing a configuration example of a signal processing section 120.

FIG. 4 is a drawing showing a configuration example of the signal processing section 120. The signal processing section 120 of the present example comprises the signal storage section 122 and the signal input/output section 128. The signal input/output section 128 comprises the designation receiving section 124 and the signal output section 126. The signal processing section 120 of the present example allocates different information for authentication with regards to each input signal that the authentication server 200 registered. The different information for authentication indicates information for authentication comprising different data contents.

For example, the signal processing section 120 deals with fingerprint data of one user's little finger and fingerprint data of the user's thumb as different types of information for authentication. Accordingly, the purposes of the authentication result, the input signal and the information for authentication are associated with each other. The signal storage section 122 associate the types of the information for authentication with the input signals allocated to each of the information for authentication and stores them.

For example, the authentication server 200 may allocate the input signal for each service provided after the user authentication. For example, when authenticating an user while logging in a computer application, the input signal and the information for authentication may be allocated per type of the application. Also, the input signal may be allocated for each service content in the same application. For example, when purchasing a product, the input signal may be allocated in accordance with the amount. Also, the authentication system 300 may authenticate by using more information for authentication when authenticating a settlement of a higher amount. The authentication server 200 designates the pre-allocated input signal to each service provided after the user authentication. Since the information for authentication is allocated to each input signal, the authentication terminal 100 authenticates the user by using different information for authentication per service.

Figure 5:
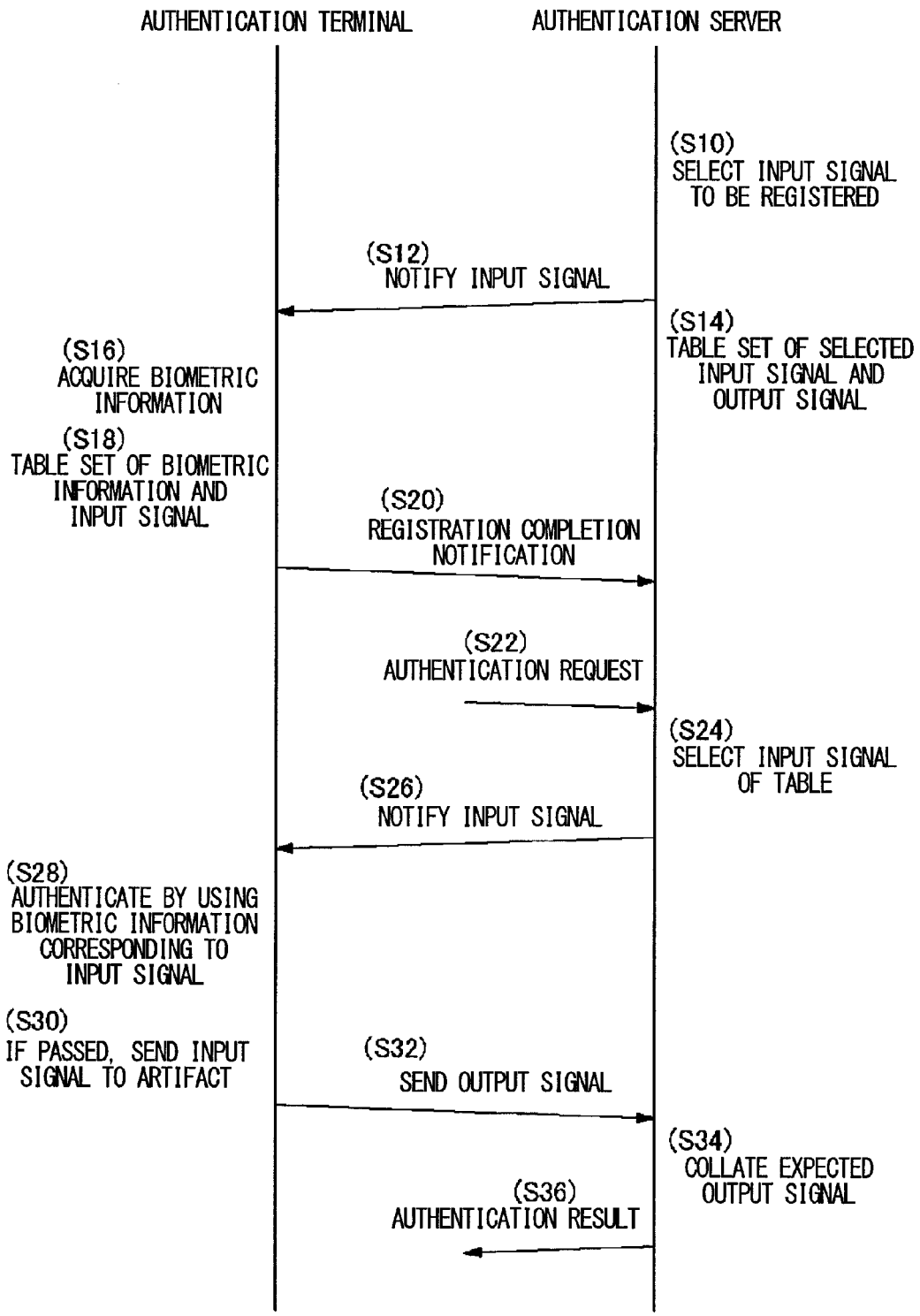
FIG. 5 is a drawing showing an operation example of the authentication system 300 shown in FIGS. 3 and 4.

FIG. 5 is a drawing showing an example operation of the authentication system 300 shown in FIGS. 3 and 4. When a new input signal is allocated for a service, the signal selection section 220 of the authentication server 200 selects the input signal allocated to the service (S10). The signal selection section 220 notifies the authentication terminal 100 of the selected input signal (S12). As shown in FIG. 3, the authentication server 200 tables and registers a set of the input signal allocated to the service and the corresponding output signal (S14).

The authentication terminal 100 urges registration of the information for authentication while presenting the type of the service associated with the input signal to the user. The authentication terminal 100 may designate the type of information for authentication to be registered with regards to the user. Also, the user may input the type of the information for authentication. The sensor 112 acquires the information for authentication provided from the user (S16). The signal processing section 120 tables a set of the type of the acquired information for authentication and the input signal and stores it in the signal storage section 122 (S18). When the table establishment is completed in the signal storage section 122, the authentication terminal 100 may notify the authentication server 200 of that (S20).

When the allocation of the information for authentication with regards to the service and the input signal is completed, the user can request the service. When the user requests the service, the signal input/output section 128 of the authentication terminal 100 presents the type of the service to the authentication server 200 and requests authentication (S22). The authentication request may be a request from a service providing server which provides the service. The signal selection section 220 of the authentication server 200 selects an input signal corresponding to the service from the characteristic storage section 210 (S24). The signal selection section 220 notifies the authentication terminal 100 of the designation information of the selected input signal (S26).

The designation receiving section 124 of the authentication terminal 100 extracts the information for authentication corresponding to the designated input signal from the signal storage section 122 and notifies the authentication apparatus 110 of that. The authentication apparatus 110 authenticates the user by using the notified information for authentication (S28). The authentication apparatus 110 may urge the user to provide the notified information for authentication and may urge to provide the information for authentication that the user designated with regards to the service beforehand.

The authentication apparatus 110 notifies the designation receiving section 124 of the authentication result of the user. When the authentication result is passed, the designation receiving section 124 selects the input signal corresponding to the information for authentication from the signal storage section 122 and inputs it in the artifact 130 (S30).

The artifact 130 outputs the operation result in accordance with the input signal. The signal output section 126 generates an output signal in accordance with the operation result and sends it to the authentication server 200 (S32). The server side authentication section 230 authenticates the user by extracting the expected output signal from the characteristic storage section 210 and collating the output signal from the authentication terminal 100 (S34). The server side authentication section 230 notifies the authentication terminal 100 of the authentication result (S36). The notification may be performed to the service providing server providing the service.

According to an operation like this, the authentication system 300 can authenticate the user by using the prescribed information for authentication per service and the input signal. Also, the authentication server 200 may allocate a plurality of input signals with regards to one service. In this case, the authentication terminal 100 allocates one information for authentication to each input signal.

The signal selection section 220 of the authentication server 200 may randomly select two or more of the allocated input signals with regards to the service and notify the authentication terminal 100 of that. The authentication apparatus 110 of the authentication terminal 100 performs authentication sequentially with regards to two or more of the information for authentication corresponding to two or more of the notified input signals respectively.

When each information for authentication in the authentication apparatus 110 is authenticated, the authentication terminal 100 inputs the corresponding input signal in the artifact 130 sequentially and sends the output signal to the authentication server 200 sequentially. The authentication server 200 authenticates the user when the expected output signals with regards to all of the designated input signals are received. Also, the authentication system 300 may regularly change the input signal allocated to each service and the information for authentication.

In other embodiments, in processes after the step S22, the user may designate any one of the information for authentication to use among the information for authentication pre-registered in the signal storage section 122. For example, in the steps S24 and S26, the signal selection section 220 selects a plurality of the input signals among the input signals pre-registered in the characteristic storage section 210 shown in FIG. 3 and notifies the authentication terminal 100 of that.

In the step S28, the authentication apparatus 110 authenticates the user based on the information for authentication designated by the user among the plurality of the information for authentication corresponding to the plurality of the input signals that the authentication server 200 designated. The designation by the user may be performed according to the provision of the information for authentication to be designated from the user to the sensor 112.

The authentication apparatus 110 may extract the template information corresponding to the information for authentication designated by the user and authenticate the information for authentication. In the step S30, when the authentication result in the authentication apparatus 110 is passed, the signal processing section 120 inputs the input signal corresponding to the information for authentication designated by the user in the artifact 130. In the step S32, the signal processing section 120 sends the output signal in accordance with the operation result of the artifact 130 to the authentication server 200.

In the step S34, the authentication server 200 judges which of the output signals preregistered in the characteristic storage section 210 shown in FIG. 3 the received output signal matches. The authentication server 200 specifies an instruction content of the user based on the input signal that the output signal corresponds to. For example, when the input signal corresponding to the output signal is a prescribed registration number, the authentication server 200 cancels the authentication processing. Also, for example, when the input signal corresponding to the output signal is the prescribed registration number, the authentication server 200 judges that the user is in an emergency and notifies an external organization of that.

Figure 6:
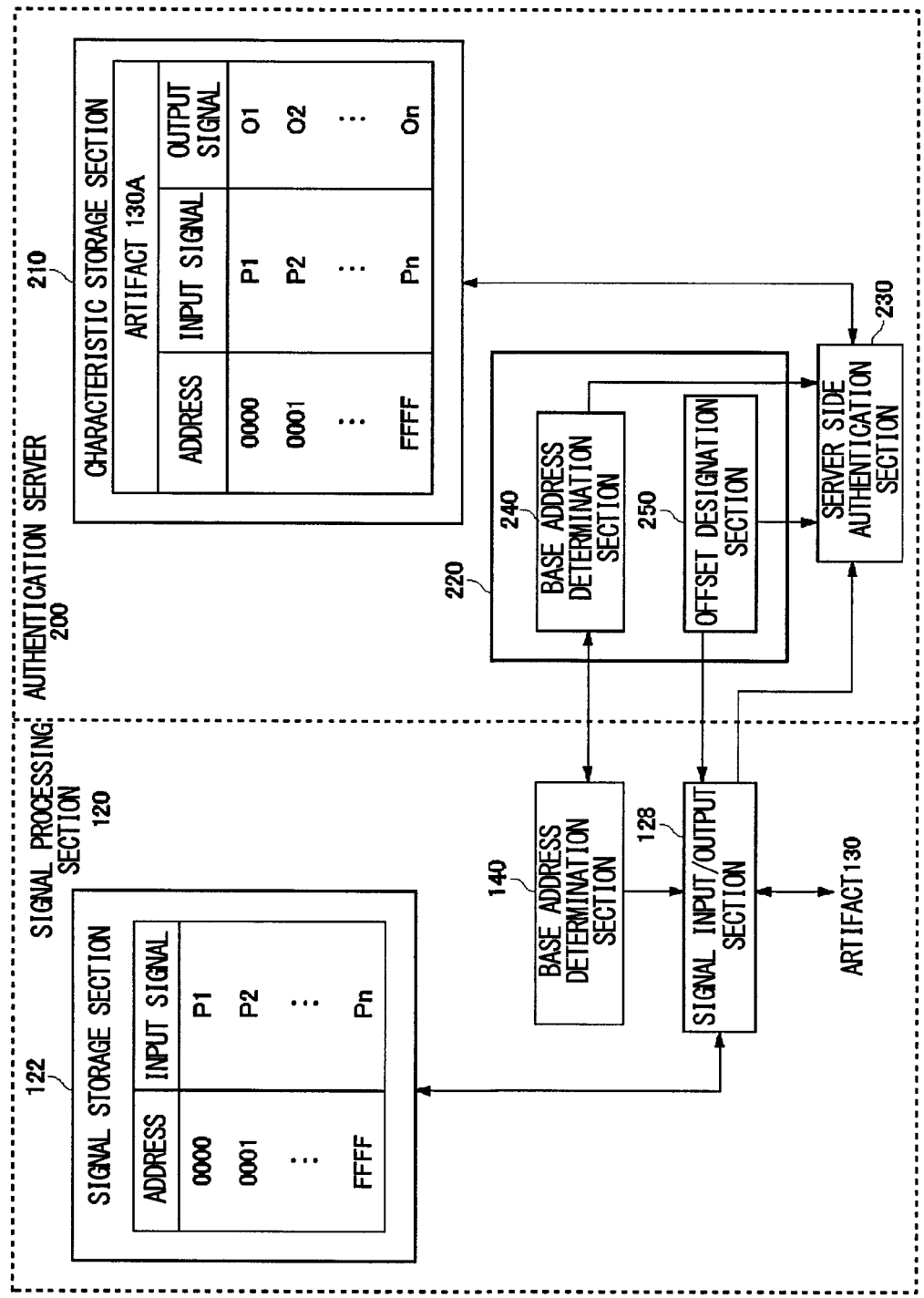
FIG. 6 is a drawing showing another configuration example of the signal processing section 120 and the authentication server 200.

FIG. 6 is a drawing showing another configuration example of the signal processing section 120 and the authentication server 200. The authentication system 300 of the present example is the same as any one of the authentication systems 300 relating and described in FIGS. 1-5, except the designation method for the input signal from the authentication server 200 to the authentication terminal 100. In the authentication system 300 of the present example, the authentication server 200 designates the input signal by designating address in the signal storage section 122 of the signal processing section 120.

The signal processing section 120 of the present example comprises the signal storage section 122, the signal input/output section 128 and the base address determination section 140. The signal input/output section 128 may comprises an identical function and configuration with the signal input/output section 128 shown in FIG. 4. The signal storage section 122 stores a plurality of input signals corresponding to a plurality of addresses beforehand.

Also, the authentication server 200 of the present example comprises the characteristic storage section 210, the signal selection section 220 and the server side authentication section 230. The signal selection section 220 comprises a base address determination section 240 and an offset designation section 250. The characteristic storage section 210 stores information of a plurality of input/output characteristics corresponding to the plurality of addresses beforehand. The characteristic storage section 210 and the signal storage section 122 comprise an address space having the same range. Also, the input signal stored in each address is the same as that in the characteristic storage section 210 and the signal storage section 122.

The base address determination section 240 on the authentication server 200 side and the base address determination section 140 on the authentication terminal 100 side of the present example predetermine a base address which is a reference of the characteristic storage section 210 and the signal storage section 122. Each base address determination section notifies the signal input/output section 128 of the signal processing section 120 and the server side authentication section 230 of the authentication server 200 of the determined base address.

The offset designation section 250 of the authentication server 200 determines a prescribed address offset and notifies the signal input/output section 128 of the authentication terminal 100 and the server side authentication section 230 of that. The offset designation section 250 may determine the address offset randomly.

The signal input/output section 128 extracts the input signal of the address shifted from the base address from the signal storage section 122 by an address offset that the offset designation section 250 designated. The signal input/output section 128 inputs the extracted input signal in the artifact 130. The signal input/output section 128 sends the output signal in accordance with the operation result of the artifact 130 to the authentication server 200.

The server side authentication section 230 extracts the expected output signal from the characteristic storage section 210 based on the base address that the base address determination section 240 determined and the address offset that the offset designation section 250 designated. The server side authentication section 230 compares the expected output signal with the output signal received from the authentication terminal 100 and authenticates the user.

According to the configuration like this, since it is not necessary to send and receive the input signal on a network, information leakage becomes less. Further, the relation between the address and the input signal in the signal storage section 122 and the characteristic storage section 210 may be changeable randomly. The signal processing section 120 and the authentication server 200 may comprise a pseudo random number generator of the same characteristic, generating a pseudo random number with regards to the input value. The authentication server 200 notifies the signal processing section 120 of the input value and generates the same random number in the authentication server 200 and the signal processing section 120. The authentication server 200 and the signal processing section 120 may change an order of the input signal in the address space based on the random number.

Figure 7:
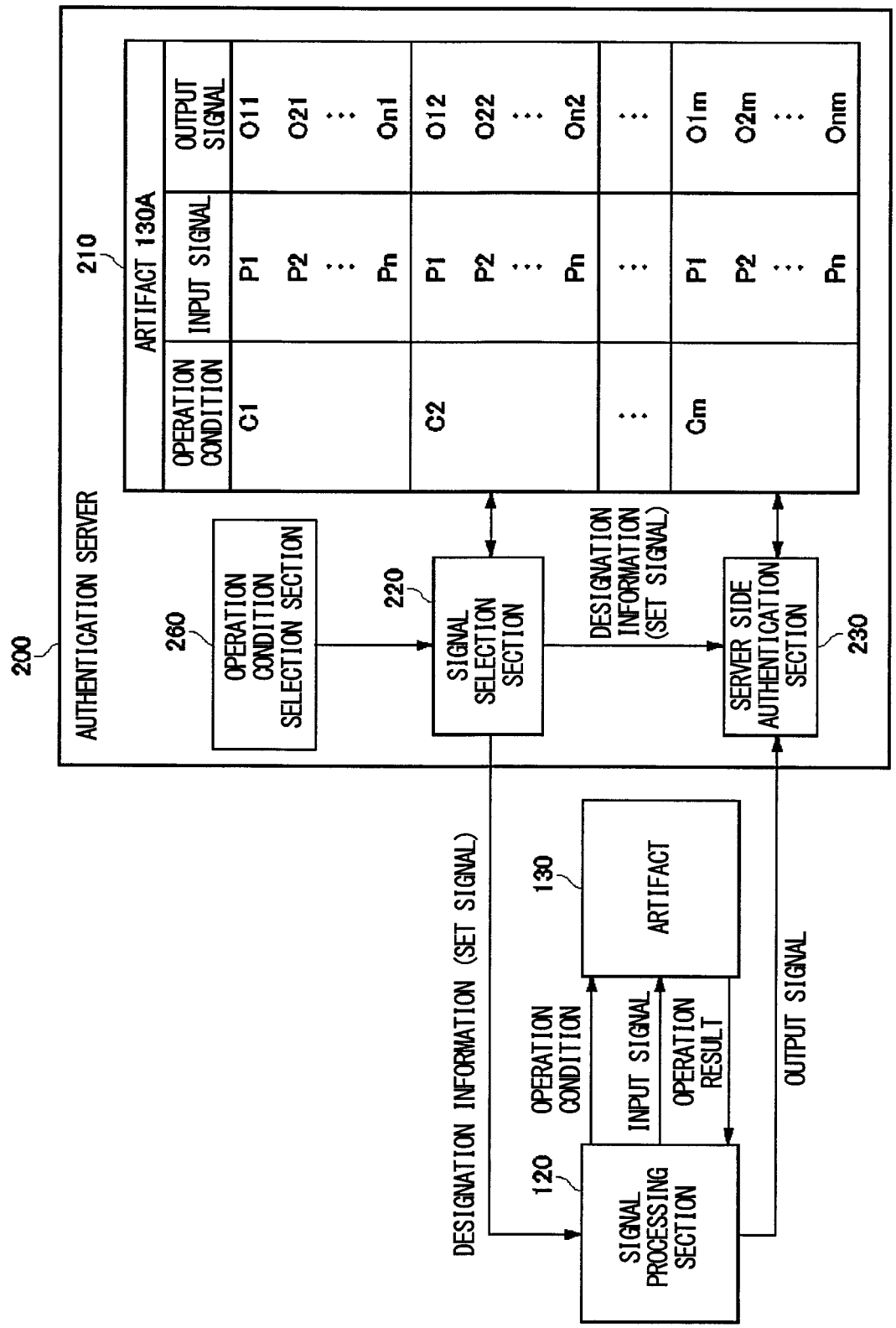
FIG. 7 is a drawing showing another configuration example of the authentication server 200.

FIG. 7 is a drawing showing another configuration example of the authentication server 200. The authentication server 200 of the present example sends a set signal setting an operation condition of the artifact 130 to the authentication terminal 100 along with the designation information designating the input signal. The operation condition is a condition that influences the input/output characteristic of the artifact 130, such as voltage to be input to a prescribed pin of a power supply voltage of the artifact 130 and the like, noise to be applied to the input signal and the like. Except a configuration and function related to an operation condition setting of the artifact 130, the authentication system 300 of the present example comprises the same configuration and function as any one of the authentication systems 300 relating and described in FIGS. 1-6.

The authentication server 200 of the present example further comprises an operation condition selection section 260 in addition to the configuration shown in FIG. 2. Also, the characteristic storage section 210 of the present example stores information showing the input/output characteristic of the artifact 130 per operation condition of the artifact 130. As shown in FIG. 7, the characteristic storage section 210 may store a set of the input signal and the output signal per operation condition and may store a correction function correcting the input/output characteristic in accordance with the operation condition.

The operation condition selection section 260 selects any one of the operation conditions that the characteristic storage section 210 stored and notifies the signal selection section 220. The signal selection section 220 selects the input signal corresponding to the notified operation condition from the characteristic storage section 210. The signal selection section 220 sends the designation information designating the selected input signal along with the set signal indicating the operation condition to the authentication terminal 100.

The signal processing section 120 of the authentication terminal 100 sets the operation condition of the artifact 130 in accordance with the set signal. After the operation condition setting is completed, the signal processing section 120 inputs the input signal in accordance with the designation information in the artifact 130. The signal processing section 120 sends the output signal in accordance with the operation result of the artifact 130 to the authentication server 200.

The server side authentication section 230 of the authentication server 200 receives the designation information and the set signal from the signal selection section 220 and extracts the corresponding output signal from the characteristic storage section 210. The server side authentication section 230 compares the output signal extracted from the characteristic storage section 210 with the output signal received from the authentication terminal 100 and authenticates the user. According to the authentication system 300 of the present example, since the operation condition is designated, it can increase variation of the output signal with regards to the input signal and further enhance security.

Also, in the present example, although the authentication server 200 selects the operation condition, the operation condition may be selected by the authentication terminal 100. In this case, the signal processing section 120 stores a selectable operation condition beforehand. After the selected operation condition is set in the artifact 130, the signal processing section 120 inputs the input signal in the artifact 130. The signal processing section 120 sends the signal indicating the set operation condition to the authentication server 200 along with the output signal in accordance with the operation result of the artifact 130.

Also, the characteristic storage section 210 of the authentication server 200 may store information showing the input/output characteristic of the artifact 130 per temperature of the artifacts 130. The signal processing section 120 of the authentication terminal 100 may comprise a temperature measurement section measuring a temperature of the artifact 130. The signal processing section 120 sends the information showing the temperature of the artifact 130 to the authentication server 200 along with the output signal.

The server side authentication section 230 extracts the output signal corresponding to the temperature of the artifact 130 from the characteristic storage section 210 and compares it with the output signal received from the authentication terminal 100. According to an operation like this, it can avoid a false authentication by temperature change. Also, the signal processing section 120 may correct the output signal based on the measured temperature and send it to the authentication server 200.

Figure 8:
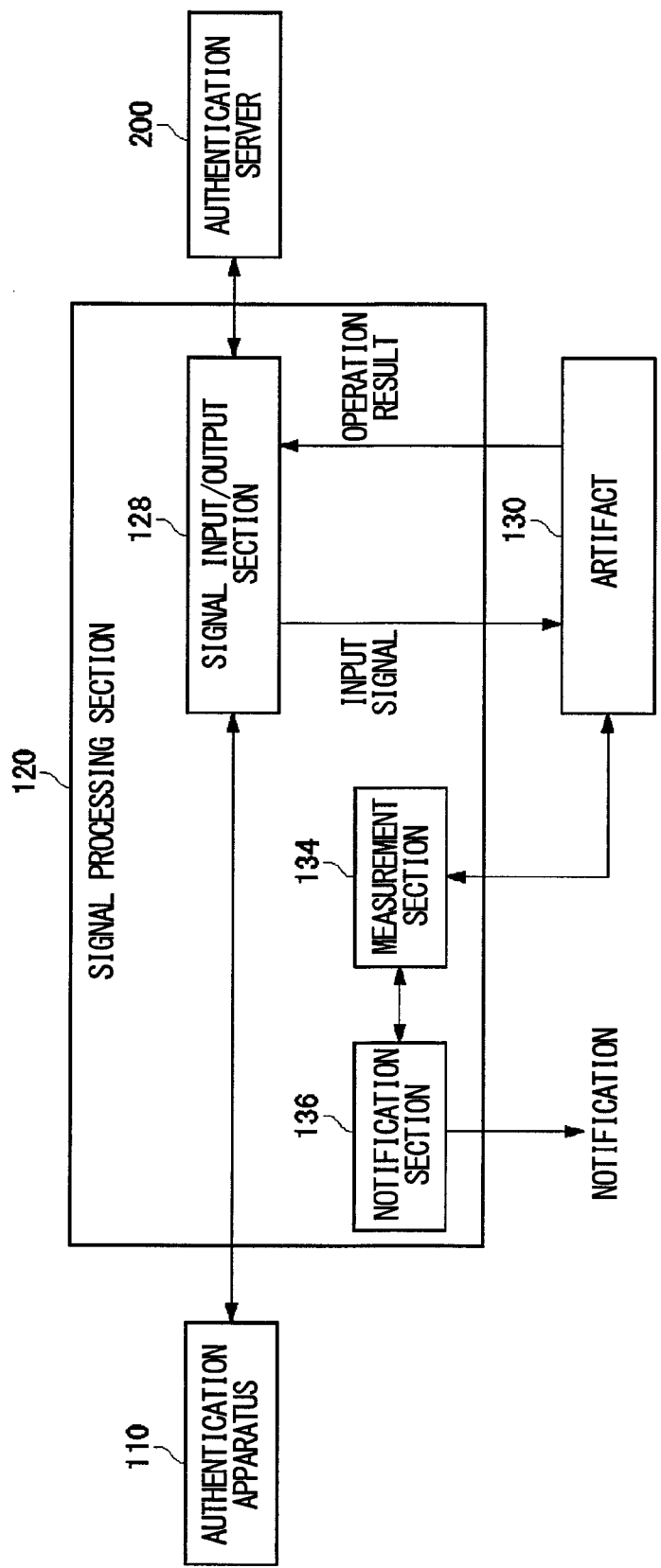
FIG. 8 is a drawing showing another configuration example of the signal processing section 120.

FIG. 8 is a drawing showing another configuration example of the signal processing section 120. The signal processing section 120 of the present example measures an aged deterioration of the characteristic of the artifact 130 and when an aged deterioration more than a prescribed one is detected, notifies an external user or the authentication server 200 and the like of that. The signal processing section 120 of the present example further comprises a measurement section 134 and a notification section 136 in addition to the configuration of the signal processing section 120 shown in FIG. 4. In FIG. 8, the signal storage section 122 is omitted. In the signal processing section 120 of the present example, function and configuration except that related to measurement and notification of aged deterioration may be the same as that of any one of the signal processing sections 120 relating and described in FIGS. 1-7.

The measurement section 134 measures an aged deterioration of the artifact 130. For example, the measurement section 134 measures a characteristic of a prescribed semiconductor element included in the artifact 130 at a prescribed time interval and measures the aged deterioration of the artifact 130 from the result of the measurement. When a variance of the characteristic of the measured semiconductor element with regards to the characteristic of the semiconductor element in an initial state is equal to or more than a prescribed variance, the measurement section 134 judges that the aged deterioration of the artifact 130 is equal to or more than the prescribed one.

When the aged deterioration of the artifact 130 is judged to be equal to or more than the prescribed one at the measurement section 134, the notification section 136 notifies outside of that. The notification section 136 may make the authentication terminal 100 display that. Accordingly, the user can know a replacement time of the artifact 130. Also, the notification section 136 may notify the authentication server 200 of that. The authentication server 200 may reject an authentication request from the authentication terminal 100 which is judged that the aged deterioration of the artifact 130 is equal to or more than the prescribed one.

Figure 9:
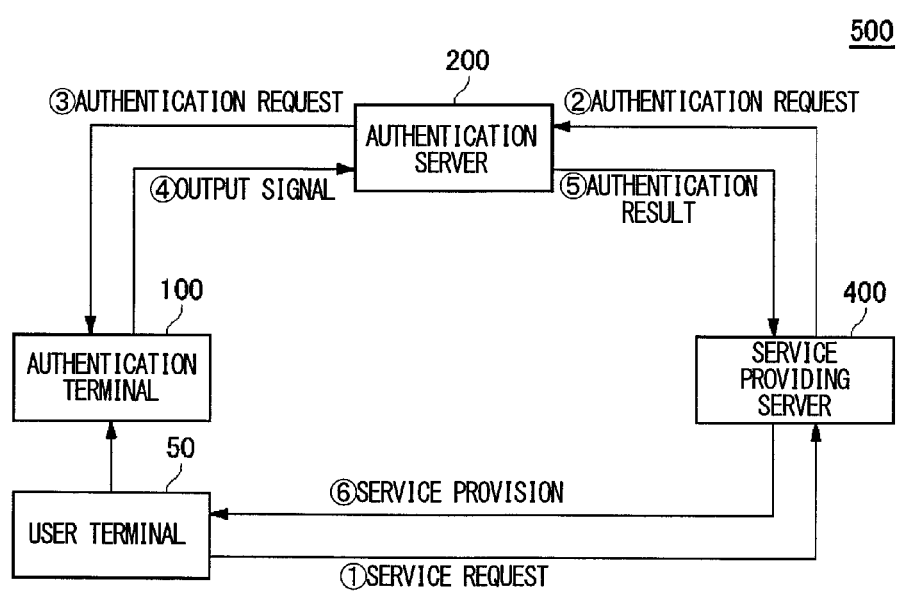
FIG. 9 is a drawing showing a configuration example of a service providing system 500.

FIG. 9 is a drawing showing a configuration example of the service providing system 500. The service providing system 500 of the present example comprises the authentication system 300 relating and described in FIGS. 1-8 (the authentication terminal 100 and the authentication server 200 in FIG. 9) and a service providing server 400. Also, the authentication terminal 100 and the service providing server 400 are arranged to be able to communicate with a user terminal 50 such as a personal computer, mobile terminal and the like. The authentication server 200 may be arranged to be able to communicate with a plurality of service providing servers 400.

The authentication terminal 100 and the user terminal 50 may be connected by cables, connectors and the like. The authentication terminal 100 may be arranged with the user terminal 50 integrally. The user terminal 50 and the service providing server 400 communicate with each other via a network such as internet and the like. Also, the communication between the authentication terminal 100 and the authentication server 200 and the communication between the authentication server 200 and the service providing server 400 are also performed via a network such as internet and the like.

The service providing server 400 operates on the server in accordance with, for example, an input from the user terminal 50 and comprises an application program providing the user terminal 50 with the operation result. When the user uses a service of the service providing server 400, at first, the user terminal 50 requests the service providing server 400 to provide the service.

When receiving a service request from the user terminal 50, the service providing server 400 requests the authentication server 200 for authentication of the user. The authentication server 200 and the authentication terminal 100 perform processes, for example, from the step S10 to the step S20 of FIG. 5 beforehand and the necessary information is pre-registered. When the authentication request is received from the service providing server 400, the authentication server 200 and the authentication terminal 100 perform processes, for example, from the step S26 to the step S36 of FIG. 5 and authenticate the user.

The authentication server 200 requests the authentication terminal 100 for authentication of the user. At this moment, the authentication server 200 designates an input signal which should be input in the artifact 130. When the user is authenticated at the authentication apparatus 110, the authentication terminal 100 inputs the designated input signal from the authentication server 200 in the artifact 130. The authentication terminal 100 sends the output signal in accordance with the operation result of the artifact 130 to the authentication server 200.

The authentication server 200 authenticates the user based on whether the output signal received from the authentication terminal 100 corresponds to the designated input signal.

The authentication server 200 sends the authentication result to the service providing server 400. When the authentication result is passed, the service providing server 400 provides the user terminal 50 with the service.

According to the configuration like this, the user authentication can be performed without transmitting the information for authentication such as biometric information and the like on the authentication server 200, the service providing server 400 and the network. Specifically, a reliability of the service provider is not always necessary to be high and since the information for authentication such as biometric information and the like is not output from the user terminal 50 and the authentication terminal 100, the user can perform the authentication with security.

Figure 10:
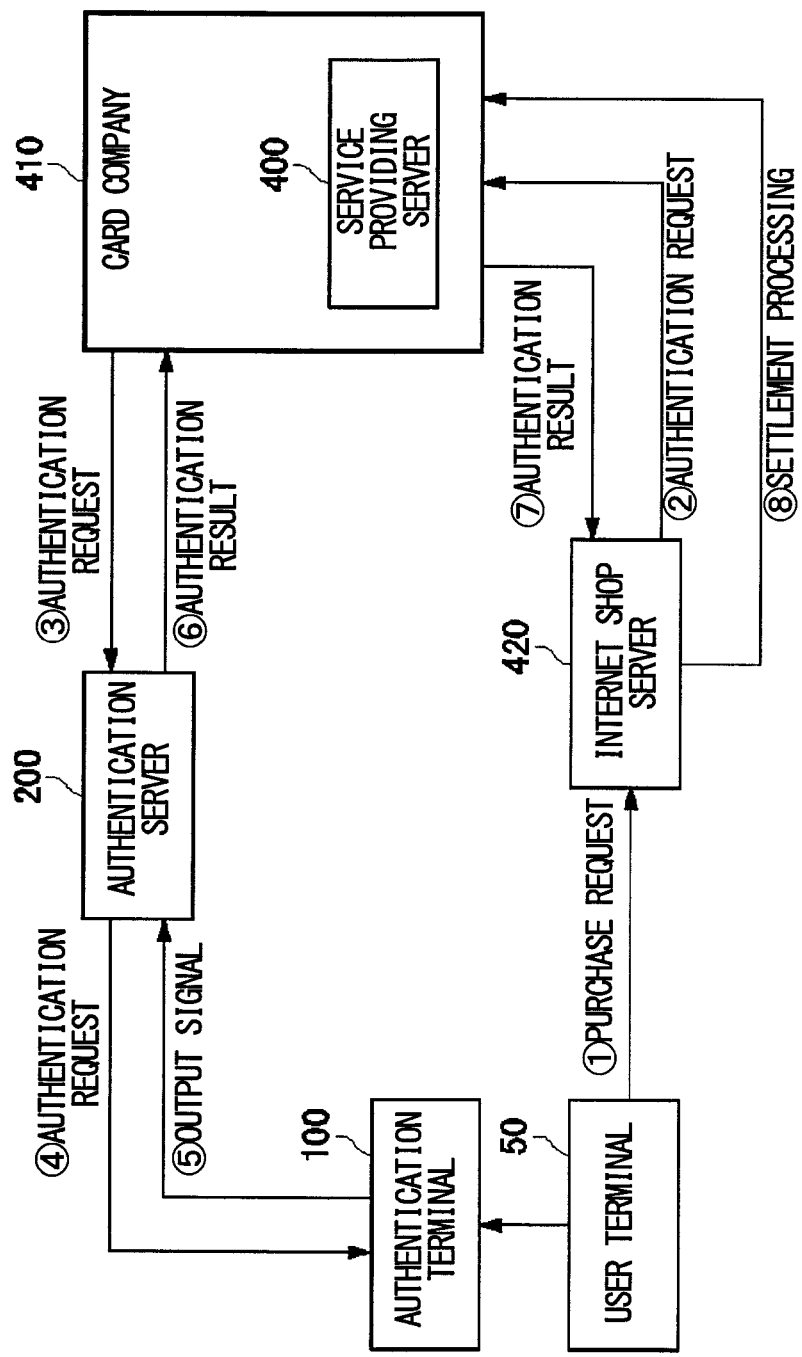
FIG. 10 is a drawing showing a configuration example of a service providing system 600.

FIG. 10 is a drawing showing a configuration example of a service providing system 600. The service providing system 600 of the present example comprises the authentication system 300 relating and described in FIGS. 1-8 (the authentication terminal 100 and the authentication server 200 of FIG. 9), the service providing server 400 and an internet shop server 420. Similar to the example of FIG. 9, the communication except that between the authentication terminal 100 and the user terminal 50 may be performed via a network such as internet and the like. Also, the service providing server 400 of the present example is a server that a card company 410 owns.

In the present example, when the user is going to purchase a product from the internet shop server 420, a purchase request is sent from the user terminal 50 to the internet shop server 420. At this moment, the user terminal 50 notifies the internet shop server 420 of information specifying the user. For example, the user terminal 50 may notify the internet shop server 420 of the information specifying the user such as address, name, birthday of the user and the like. The internet shop server 420 specifies the user with regards to the service providing server 400 of the card company 410 and requests the user authentication.

The service providing server 400, the authentication server 200 and the authentication terminal 100 operate similar to the example shown in FIG. 9 and authenticate the user. The service providing server 400 notifies the internet shop server 420 of the authentication result of the user.

When the user is authenticated, the internet shop server 420 sends the payment amount of the product designated by the user and the information specifying the user to the service providing server 400 and requests a settlement processing. When the authentication of the specified user is passed, the service providing server 400 performs the settlement process in accordance with the settlement processing request from the internet shop server 420. The service providing server 400 stores a card number corresponding to the specified user beforehand and may perform the settlement processing based on the card number. When the authentication of the user is failed, the service providing server 400 notifies the internet shop server 420 of that and does not perform the settlement processing.

According to the configuration like this, a user authentication can be performed without transmitting information for authentication such as biometric information and the like on the authentication server 200, the internet shop server 420, the service providing server 400 and the network. Since the information for authentication such as biometric information and the like is not output from the user terminal 50 and the authentication terminal 100, the user can perform the authentication with security.

As above, according to the authentication system 300, the authentication of the biometric information and the like are performed at the authentication terminal 100, and when the authentication result is passed, the input signal without including information of the authentication subject is input in the artifact 130 and the output signal in accordance with the operation result of the artifact 130 is sent from the authentication terminal 100. At the authentication server 200, the artifact 130 is identified from the relation between the input signal and the output signal by using the peculiar characteristic of the artifact 130. Therefore, the information for authentication which is not changeable such as biometric information is not sent from the authentication terminal 100 and a leakage of biometric information and the like can be prevented. Also, even if the information of the characteristic of the artifact 130 is leaked, it is only needed to replace the artifact 130. Like this, according to the authentication system 300, disadvantages of unchangeable and unreplaceable information such as biometric information and the like can be overcome while using authentication of biometric information and the like.

Also, a cancellable biometric technique of sending codes generated by multiplying a prescribed function to biometric information is known. Even the code is leaked, a new code can be generated by changing the function. However, since the code is generated from the biometric information, a possibility that the biometric information itself is predicted from the code cannot be eliminated. On the other hand, according to the authentication system 300, since information based on information for authentication such as biometric information and the like is not included in the signal output from the authentication terminal 100, a higher reliability can be enhanced.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. An authentication method comprising:
   producing, by an authentication terminal, an artifact authentication result; and
   authenticating, by an authentication server, an authentication subject based on the artifact authentication result, wherein
   the producing the artifact authentication result includes:
      authenticating, using an authentication apparatus on the authentication terminal, the authentication subject using inherent information of the authentication subject;
      receiving, at a signal processing section included in the authentication terminal, a subject authentication result, from the authentication apparatus, indicating whether the authentication subject is authenticated;
      receiving, at the signal processing section, designation information from the authentication server;
      inputting, by the signal processing section to an artifact on the authentication terminal only if the authentication subject is authenticated by the authentication apparatus, as an input signal, a signal based on the designation information from the authentication server, the input signal not including the inherent information of the authentication subject;
      performing, at the artifact, an operation in accordance with the input signal and outputting, from the artifact, a result of the operation as an operation result; and
      outputting, from the signal processing section to the authentication server, as the artifact authentication result, an output signal in accordance with the operation result of the artifact, and
   the authenticating the authentication subject based on the artifact authentication result includes:
      storing information indicating an input/output characteristic of the artifact; and
      authenticating the authentication subject based on whether the artifact authentication result indicates that the input signal resulted in the output signal in accordance with the input/output characteristic of the artifact;
   wherein the producing the artifact authentication result further includes:
      storing a plurality of input signals in association with a plurality of addresses;
      determining a base address with the authentication server; and
      inputting the input signal, from the signal processing section to the artifact, at an address shifted from the base address by an address offset designated by the authentication server.

2. The authentication method according to claim 1, further comprising performing, at the authentication server, the steps of:
   storing a table associating an input signal and an expected output signal for each of a plurality of authentication terminals, and
   selecting the input signal corresponding to the authentication terminal and sending it to the authentication terminal.

3. The authentication method according to claim 1, wherein
   the authenticating the authentication subject based on the artifact authentication result further includes:
      determining the base address with the signal processing section; and
      designating the address offset with regards to the signal processing section.

4. The authentication method according to claim 1, wherein
   the producing the artifact authentication result further includes
      storing a plurality of types of inherent information of the authentication subject in association with a plurality of signals; and
      notifying the authentication apparatus of the type of the inherent information corresponding to the signal designated by the authentication server, and
   the authenticating at the authentication apparatus includes authenticating the authentication subject based on the notified type of the inherent information.

5. The authentication method according to claim 4, further comprising:
performing, at the authentication server,
designating two or more of the stored plurality of signals; and
sequentially authenticating, at the authentication apparatus, the authentication subject based on the types of the inherent information corresponding to each of the designated signals.

6. The authentication method according to claim 4, further comprising
designating, at the authentication server, the input signal in accordance with a purpose of the artifact authentication result with regards to the signal processing section.

7. The authentication method according to claim 1, further comprising:
performing, at the authentication terminal, the steps of:
storing a plurality of types of inherent information of the authentication subject in association with a plurality of signals;
authenticating, at the authentication apparatus, the authentication subject based on a type of the inherent information designated by the authentication subject; and
inputting, from the signal processing section to the artifact, the input signal corresponding to the inherent information designated by the authentication subject, and
specifying, by the authentication server, an instruction content of the authentication subject based on the input signals that the output signal corresponds to.

8. The authentication method according to claim 1, further comprising:
sending, by the authentication server, a set signal setting an operating condition of the artifact along with a signal designating the input signal to the authentication terminal; and
setting, at the signal processing section, the operating condition of the artifact based on the set signal received along with the signal designating the input signal.

9. The authentication method according to claim 8, further comprising:
performing, at the authentication server, the steps of:
storing information indicating an input/output characteristic of the artifact for each of a plurality of operation conditions of the artifact; and
authenticating the authentication subject based on whether the artifact authentication result indicates that the input signal resulted in the output signal corresponding to the set signal.

10. The authentication method according to claim 1, further comprising:
storing, at the authentication server, information indicating an input/output characteristic of the artifact for each of a plurality of temperatures of the artifact;
outputting, from the authentication terminal to the authentication server, information indicating a temperature of the artifact along with the output signal; and
authenticating, at the authentication server, the authentication subject based on whether the artifact authentication result indicates that the input signal resulted in the output signal corresponding to the temperature.

11. The authentication method according to claim 1, further comprising:
authenticating, at the authentication apparatus, the authentication subject based on biometric information of the authentication subject.

12. A service providing method comprising:
performing the authentication method according to claim 1; and
providing, by a service providing server, services to a user only if the user is authenticated by the authentication method.

13. The service providing method according to claim 12, further comprising:
requesting, by the service providing server, authentication of the user to the authentication server when the authentication terminal requests a service provision to the service providing server.

* * * * *